United States Patent [19]

Tansuwan

[11] Patent Number: 4,512,309
[45] Date of Patent: Apr. 23, 1985

[54] SPARK CONTROL APPARATUS
[75] Inventor: Chusak Tansuwan, Manchester, Mo.
[73] Assignee: ACF Industries, Inc., New York, N.Y.
[21] Appl. No.: 490,974
[22] Filed: May 2, 1983
[51] Int. Cl.³ .............................................. F02B 5/04
[52] U.S. Cl. ............................ 123/425; 123/146.5 D; 123/632
[58] Field of Search ................. 123/425, 146.5 D, 632
[56] References Cited
U.S. PATENT DOCUMENTS

| | | | |
|---|---|---|---|
| 3,745,985 | 7/1973 | Hohne | 123/146.5 D |
| 3,874,355 | 4/1975 | Suda | 123/632 |
| 3,937,193 | 2/1976 | Kim | 123/632 |
| 4,128,091 | 12/1978 | Balan | 123/632 |
| 4,368,717 | 1/1983 | Roberts | 123/632 |
| 4,422,421 | 12/1983 | Ezoe | 123/425 |

Primary Examiner—Ronald B. Cox
Attorney, Agent, or Firm—J. Joseph Muller

[57] ABSTRACT

A spark control apparatus (1) for an internal combustion engine using a breaker point (3) or solid state (5) ignition to control current to an ignition coil (11). The waveform of the ignition signal from the ignition system is applied to a converter section (35) of the apparatus to convert the signal waveform to a predetermined waveform. A sensor (25) senses engine vibration and generates a representative electrical signal which a signal processor (41) processes to determine engine knock by comparing the peak and average values of the signal. A delay circuit (45) delays termination of current to the ignition coil and thus the ignition timing as a function of the comparison of the peak and average values of the control signal. When there is no knock, the timing slowly returns to normal. A driver (50) responds to current signals to control current to the ignition coil. The driver is shut off when the engine is not running to reduce current drain. A first transistor (Q12) switches on and off when the engine is running and is off when the engine is not running. A second transistor (Q13) turns off the driver when the transistor is on. A controller (Q17, C14, R48 and R49) controls this transistor to turn it on when the engine is not running. The controller responds to changes in operating states of the first transistor to switch the operating state of the second transistor.

21 Claims, 3 Drawing Figures

SPARK CONTROL APPARATUS

BACKGROUND OF THE INVENTION

This invention relates to ignition systems for internal combustion engines and more particularly, to controlling ignition timing to eliminate engine knock.

In recent years, there have been many modifications to automobile engine systems. These include the addition of components such as emissions control components and catalytic converters as well as changes in gasoline formulations which eliminate lead and affect octane ratings. One by-product of these changes is a condition prevalent in many automobiles called "knocking". This phenomena is caused by improper ignition of fuel in engine cylinders and causes severe pounding against side wall of the cylinders. One way to eliminate knocking is to retard the ignition timing for the engine. Various schemes to adjust or retard engine timing are shown, for example, in U.S. Pat. Nos. 4,061,116; 4,106,447; 4,130,096; 4,211,194; 4,233,944; 4,236,491; 4,243,007; 4,243,008; 4,249,494; 4,257,364; and, 4,275,692.

Typically, the various systems employed use some type of sensor or method for detecting a knock condition, manipulating the signal generated by the engine's ignition system and supplying this manipulated signal to the ignition coil which fires the spark plugs to combust the mixture in the engine cylinders. Two areas of concern in implementing any of these various schemes involve prevention of damage to the ignition coil and also responsiveness of the retarding circuitry to engine operation at higher rpm's (6,000 rpm and up). It is particularly important to disconnect the circuitry manipulating the signal from the ignition system from the ignition coil when the engine is not running in order to eliminate current drain and prolong the life of the coil. One way of doing this is shown in the Borst et. al. U.S. Pat. No. 4,088,106 which uses a counter, a speed related signal and a clock. The circuitry is designed to sense when the engine is operating at very low speed or has stopped in order to open a switch controlling current flow through the ignition coil. While the above described circuitry will disconnect current flow to the ignition coil, thus preventing current drain through the system, additional circuit components are required in addition to those already utilized to retard ignition timing.

SUMMARY OF THE INVENTION

Amoung the several objects of the present invention may be noted the provision of spark control apparatus for an internal combustion engine which is usable with either a breaker point or solid state ignition system; the provision of such apparatus to sense a knocking condition in cylinders of the engine and to modify the ignition signal generated by the ignition system to eliminate the knock; the provision of such apparatus which properly controls modification of the signal at high engine rpm's; the provision of such apparatus for preventing current drain when the engine is not running; the provision of such apparatus for prolonging the life of the ignition coil; the provision of such apparatus to rapidly retard the ignition signal when a knocking condition is sensed but slow to return the ignition signal back to its original condition once the knocking condition has stopped; and, the provision of such apparatus which is readily installed in an automobile.

Briefly, the present invention is for spark control apparatus for an internal combustion engine using either a breaker point or solid state ignition system. The apparatus controls current to an ignition coil and converts the waveform of the ignition signal from the ignition system to a predetermined waveform. A sensor senses engine vibration and generates an electrical signal representative thereof. This electrical signal is processed to determine engine knock by comparing its peak and average values. Timing of the signal from the ignition system to the ignition coil is delayed as a function of the comparision of the peak and average values of the sensor signal. A driver is responsive to the current signal to control current to the ignition coil. The driver is shut off when the engine is not running to prevent application of current to the ignition coil and reduce current drain. The shut-off circuitry includes a first switch which normally switches on and off when the engine is running and remains off when the engine is not running. A second switch turns off the driver when the switch is on. Finally, circuitry is provided to control the second switch to turn it on when the engine is not running. This control circuitry is responsive to changes in the operating state of the first switch to switch the operating state of the second switch. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
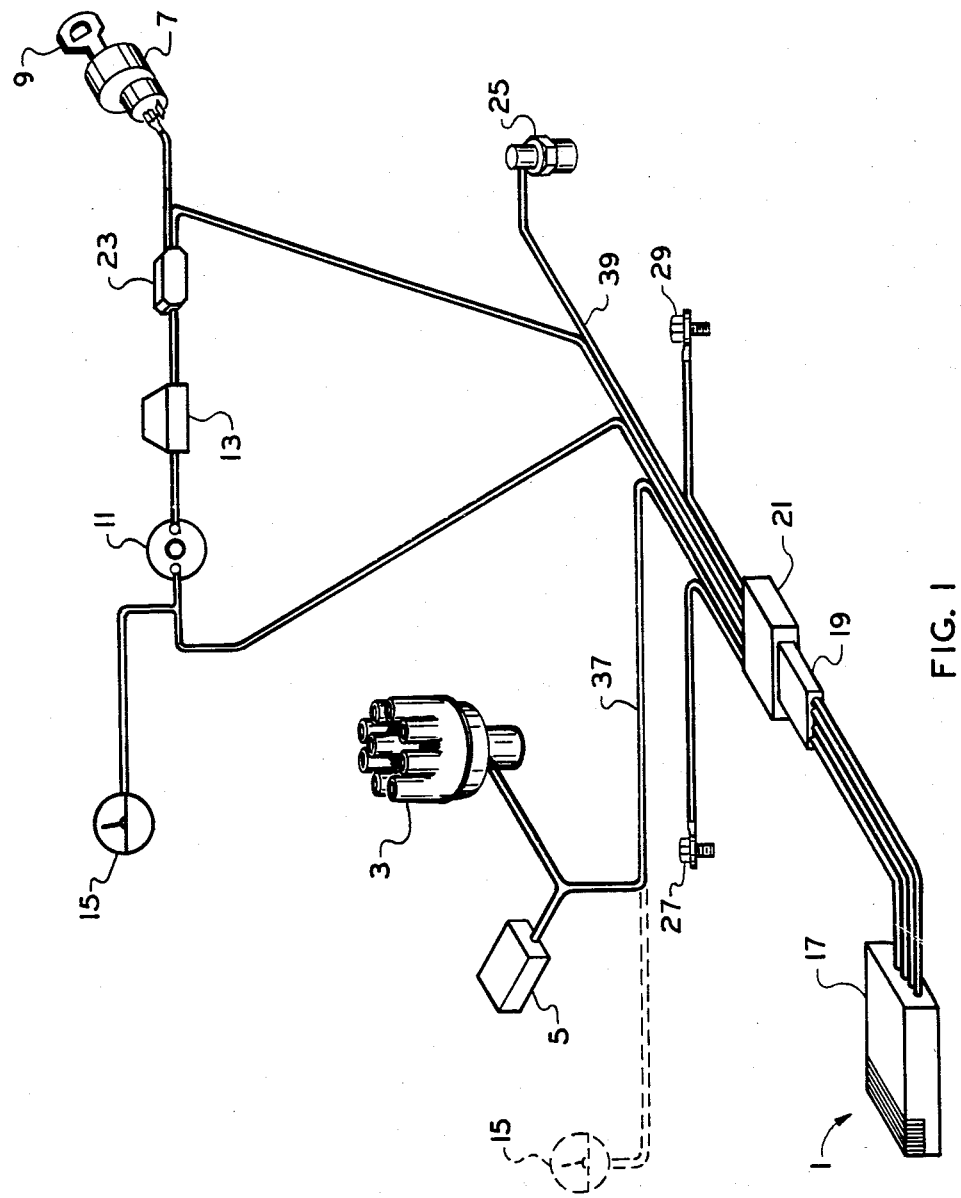
FIG. 1 is a representation of various components of the ignition system of an automobile illustrating installation of apparatus of the present invention into the ignition system.

Referring to FIG. 1, a spark control apparatus of the present invention is indicated generally 1 and is for an internal combustion engine (not shown) using either a breaker point ignition system 3 or a solid state ignition system 5. The automotive ignition system has the typical elements including an ignition switch 7 receiving an operator inserted key 9, as well as an ignition coil 11 and a ballast resistor 13. Some automobiles also have a tachometer 15. Apparatus 1 comprises an electronic control unit 17 for controlling current supply to coil 11 and unit 17 is installed in the system via appropriate electrical connectors 19 and 21. An electrical tap 23 is provided to route key-activated battery voltage to electronic control unit 17. A sensor 25 is a knock sensor of the type manufactured by Telex Communications, Inc. of Minneapolis, Minn. This sensor is mounted on the intake manifold (not shown) of the engine. Appropriate electrical grounding is provided as indicated at 27 and 29. As will be discussed hereinafter, the ignition signal generated by breaker point ignition system 3 or solid state ignition system 5 is routed to electronic control unit 17 as is a vibration signal produced by sensor 25. The signal generated by electronic unit 17 to retard ignition timing is supplied by the electronic control unit to ignition coil 11 when the engine is running. It is a feature of the invention that no current is provided to the ignition coil when the ignition switch is turned on but the engine is not running.

Figure 2A:
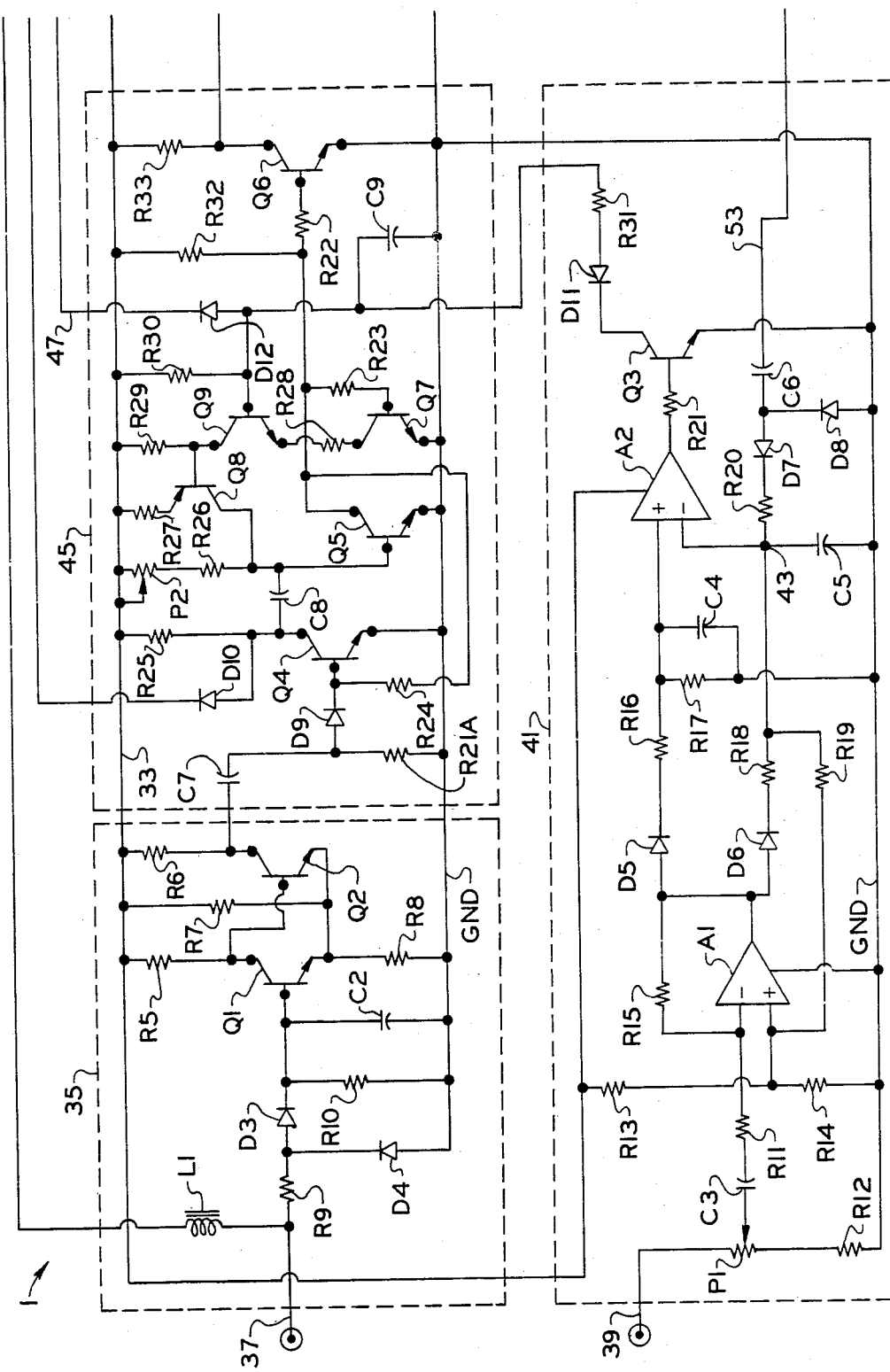
FIGS. 2A and 2B are schematic circuit diagrams illustrating of the apparatus of the present invention.
Figure 2B:
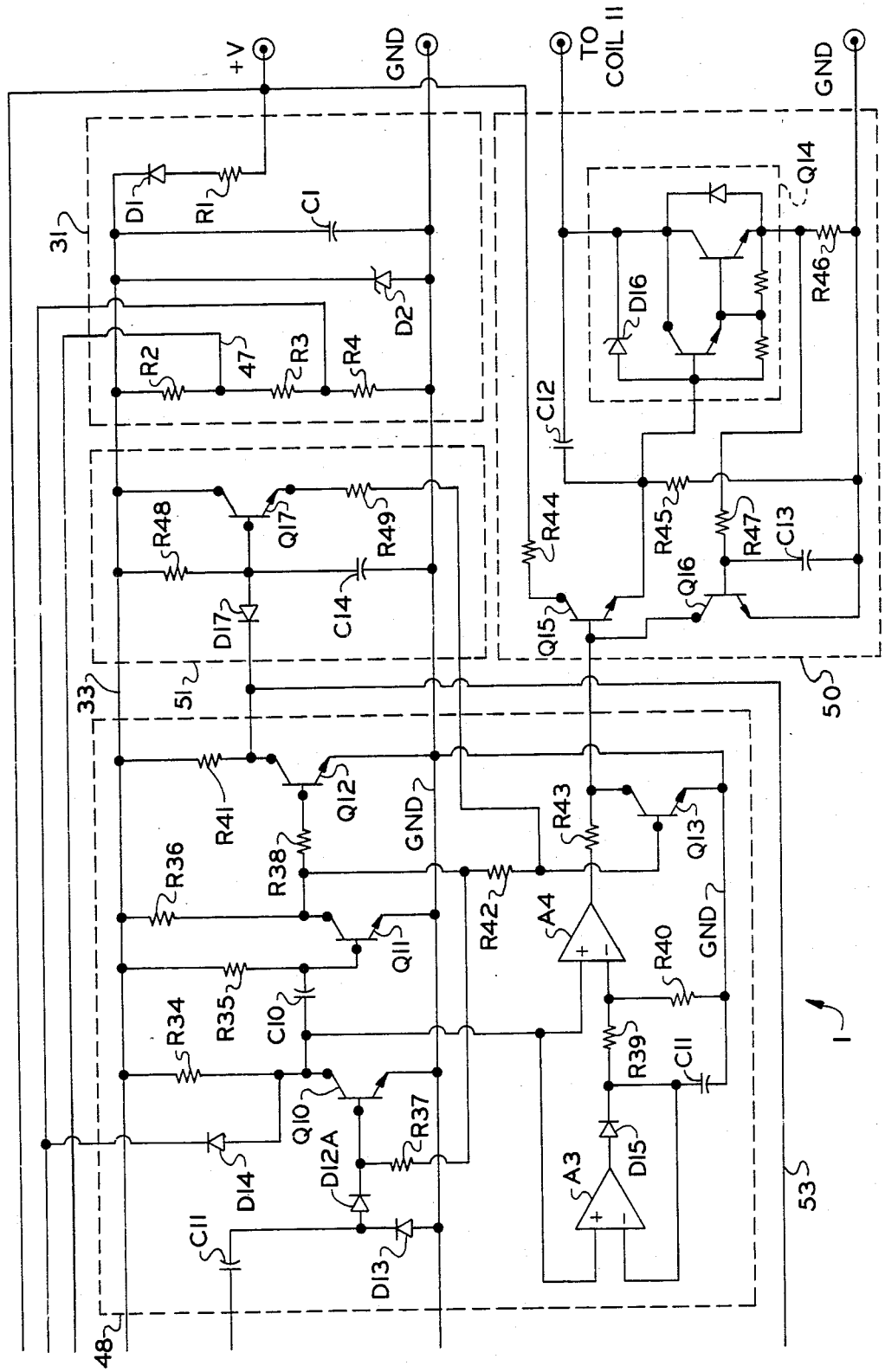

Referring now to FIGS. 2A and 2B, apparatus 1 first includes a voltage regulator section 31 (see FIG. 2B).

Regulator 31 includes an input resistor R1 series connected with a diode D1 used to block negative voltage transients. A filter capacitor C1 is connected in parallel between diode D1 and ground. A zener diode D2, connected in parallel with capacitor C1, provides voltage regulation. A voltage divider network comprising resistors R2, R3 and R4 is connected in parallel with zener diode D2 and produces clamping voltages for other circuits within the electronics control unit. The regulated voltage produced by section 31 is supplied to other portions of the electronics unit via a bus line 33.

Referring to FIG. 2A, the spark control apparatus comprises a means designated generally 35 for converting the waveform of the ignition signal from ignition system 3 or 5 to a predetermined waveform which is, for example, a squarewave. As shown in FIG. 1, the ignition signal from either breaker point system 3 or solid state ignition system 5 is provided on a line 37. The waveform squaring circuitry of means 35 includes a transistor Q1 whose collector is connected to the base of a transistor Q2. Bias resistors R5 and R6 are respectively connected between bus line 33 and the respective collectors of transistors Q1 and Q2. The emitters of transistors Q1 and Q2 are commonly connected between a resistor R7, and a resistor R8; these resistors forming a voltage divider network from bus 33 to ground.

Input line 37 is connected to the base of transistor Q1 through a diode D3. A clamping diode D4, connected in parallel between diode D3 and ground, clamps any negative voltage excursions in the input signal to electronics unit 17. A resistor R9, connected in series with diode D3, and a resistor R10 and a capacitor C2, both of which are connected in parallel between diode D3 and electrical ground, comprise a low-pass filter with respect to noise on the input line. Finally, an inductor L1 is connected between input line 37 and the positive voltage input to unit 17 and provides a load for ignition system 3 or 5. Inductor L1 is advantageous when apparatus 1 of the invention is used on a vehicle having a tachometer 15 connected to the breaker point or solid state ignition rather than to coil 11.

Waveform squaring circuit 35 functions as is well known in the art to convert the current waveform from the ignition system to a square-wave at the collector of transistor Q2. The resultant square waveform is then processed as will now be described.

As previously noted, sensor 25 senses engine vibration and generates electrical signal representative thereof. This signal is supplied to apparatus 1 on line 39. Apparatus 1 includes means 41 for processing this electrical signal to determine engine knock by comparing the peak and average values of the signal. Processing means 41 includes an operational amplifier A1 used as an a.c. amplifier. The detected vibration signal is supplied to the inverting input of amplifier A1 via the tap of a sensitivity adjustment potentiometer P1. A capacitor C3 and a resistor R11 are connected in series with the tap and act as a high-pass filter of the signal. A resistor R12 is connected between potentiometer P1 and electrical ground. The non-inverting input of amplifier A1 is connected between resistors R13 and R14 which form a voltage divider network. A resistor R15 is connected between the output of amplifier A1 and its inverting input to provide a feedback path for the amplifier. Resistors R11 and R15 together determine the gain of amplifier A1.

The amplifier output signal from amplifier A1 is processed in two ways: The signal is routed via a first path through a diode D5 and a resistor R16 to the non-inverting input of an operational amplifier A2. A resistor R17 and a capacitor C4 are connected in parallel between this input of the amplifier and ground. The amplified signal from amplifier A1 is also routed via a diode D6 and a resistor R18 to a summing point 43. This summing point is connected to the inverting input of amplifier A2. A capacitor C5 is connected between summing point 43 and electrical ground. A resistor R19 has one lead connected to the non-inverting input of amplifier A1 and the other lead of the resistor is connected to summing point 43. Resistor R19 provides a bias voltage and a discharge path for capacitor C5.

Capacitor C4 holds the peak level of the amplified vibration signal while capacitor C5 holds the average signal level. Amplifier A2 functions as a comparator to compare the peak level of the vibration signal with the average level thereof. Besides the average level generated at summing point 43, the voltage supplied to the inverting input of amplifier A2 from the summing point has a further component. This is a voltage developed by a frequency-to-voltage convertor comprising a resistor R20 connected in series with a diode D7 and a capacitor C6. The converter further includes a diode D8 whose anode is connected to ground and whose cathode is connected between diode D7 and capacitor C6. The source of the input to this frequency-to-voltage circuit will be described hereinafter.

The output of comparator A2 is connected to the base of a transistor Q3 through a resistor R21 and turns transistor Q3 on for any period during which the peak value of the detected vibration signal exceeds the average value of the signal. This indicates an engine knock condition.

Apparatus 1 next includes means 45 for delaying the ignition signal from the ignition system to coil 11 as a function of the comparison of the peak and average values of the detected vibration signal processed by means 41. Means 45 includes a transistor Q4 and the output of transistor Q2 is a.c. coupled to the base of transistor Q4 via a coupling capacitor C7 and a resistor R21A. A diode D9 is series connected in the base circuit of transistor Q4 to permit the delay circuitry now being described to be triggered on the positive going edge of the square-wave signal supplied by means 35.

The collector of transistor Q4 is coupled to the base of a transistor Q5 through a capacitor C8. The collector of transistor Q5 is connected to the base of a transistor Q6 through a resistor R22, to the base of a transistor Q7 through a resistor R23, and to the base of transistor Q4 through a resistor R24. A bias resistor R25 is connected between bus line 33 and the collector of transistor Q4. A diode D10 clamps the voltage at the collector of transistor Q4 to limit the reverse bias voltage at the base of transistor Q5 and to reduce the amount of retardation of the signal to ignition coil 11 at low frequency conditions (engine cranking) to prevent engine crossfiring.

Capacitor C8 is provided with two discharge paths. The first of these includes a potentiometer P2 connected in series with a resistor R26. Potentiometer P2 adjusts the duty cycle of the waveform supplied to the ignition coil as a function of the number of engine cylinders. Thus, the resistance of the potentiometer can be adjusted for a 4, 6, or 8-cylinder automobile engine thereby permitting apparatus 1 to be used with a wide range of engines. The second path includes a resistor R27 and the emitter-collector circuit of a transistor Q8. The base of transistor Q8 is connected to the collector of a transistor Q9 whose emitter is connected to the collector of transistor Q7 through a resistor R28. A bias resistor R29 is connected between bus line 33 and the collector of transistor Q9, and a bias resistor R30 is connected between the bus line and the base of this transistor.

A capacitor C9 is connected between the base of transistor Q9 and electrical ground and is charged by resistor R30 when transistor Q3 is off. The voltage across capacitor C9 is clamped by a diode D12 to a bus line 47 from voltage regulator 31. Capacitor C9 is discharged when transistor Q3 is turned on and the discharge path for the capacitor includes a resistor R31 and a diode D11. For reasons to be described hereinafter, the value of resistor R30 is very much greater than the value of resistor R31.

Transistors Q4 and Q5 and their associated circuitry comprise a monostable multivibrator circuit to provide a duty cycle signal in a frequency range of approximately 20–400 Hz. Transistors Q7, Q8, and Q9 and their associated circuitry operate to vary the duty cycle between a minimum and a maximum value. The maximum duty cycle is determined by the setting of potentiometer P2. Transistor Q6, resistor R22 and bias resistors R32 and R33 function as a buffer circuit and invert the output signal from transistor Q5. The duty cycle of the waveform produced by the monostable multivibrator and hence the amount of retardation of the signal supplied to ignition coil 11 is controlled by the voltage across capacitor C9. The charge level on capacitor C9 controls the operating state of transistor Q9 and hence the discharge rate of capacitor C8. When the output of comparator A2 turns transistor Q3 on, capacitor C9 discharges through resistor R31, diode D11 and the transistor. The length of time the capacitor C9 discharges is a function of the "on" time of transistor Q3 which, in turn, is a function of the peak value of the detected vibration signal compared to the average value of the signal. Consequently, the greater the peak value exceeds the average value, the longer capacitor C9 will discharge and the greater amount of retardation which will be produced by means 45. Conversely, the less the difference between the peak and average values of the detected known signal the less time capacitor C9 will discharge and the less degree of retardation in the signals supplied ignition coil 11. Further, because resistor R31 has a much smaller value than resistor R30, the discharge rate of capacitor C9 is much faster than its charge rate. This means that when a knock condition occurs, the ignition signal is rapidly retarded but when the knock condition terminates, the ignition signal is only slowly returned back to its normal condition.

Transistors Q7 and Q9 and their associated circuitry together comprise means for insuring proper functioning of delay means 45 at higher engine rpms. As previously described, capacitor C8 has two discharge current paths one of which is controlled by transistor Q8. At engine speeds of approximately 6,000 rpms and higher, the switching rates of the monostable multivibrator are such that certain instabilities occur and capacitor C8 would not properly be discharged. To correct this, the operating condition of transistor Q9 is controlled by transistor Q7 which functions as a switch. Transistor Q9, in turn, controls the operating condition of transistor Q8. Consequently, when transistor Q7 is on, transistor Q9 assumes an operating condition controlled by the charge on capacitor C9 and permits transistor Q8 to provide a discharge path for capacitor C8. The amount of current flowing through this discharge path is a function of the degree to which transistor Q8 is turned on. When transistor Q7 is off, transistor Q9 is also off and the discharge path for capacitor C8 through transistor Q8 is blocked.

As can thus be seen, transistor Q4 is a solid-state device acting to control the charge path for capacitor C8 through resistor R25 and transistor Q9 is a second solid-state device acting to control a discharge path of the capacitor through transistor Q8. The charge level on capacitor C9 controls the operating condition or state of transistor Q9 while transistor Q7 is a third solid-state device acting as a switch to render transistor Q9 operative or inoperative.

Apparatus 1 next includes a dwell means 48 (see FIG. 2B). Dwell control means 48 includes a monostable multivibrator comprising transistors Q10 and Q11, a capacitor C10 interconnecting the collector of transistor Q10 with the base of transistor Q11 and bias resistors R34, R35 and R36. A capacitor C11 and a diode D12A couple the output of transistor Q6 (see FIG. 2A) with the base of transistor Q10. A diode D13 provides a discharge path for capacitor C11. Another diode D14 clamps the voltage at the collector of transistor Q10 to prevent the base of transistor Q11 from being excessively reverse biased. The collector of transistor Q11 is tied back to the base of transistor Q10 by a resistor R37 and the signal at the collector of transistor Q11 is provided the the base of a switching transistor Q12 through a resistor R38. The monostable multivibrator comprising transistors Q10 and Q11 and their associated circuitry operates satisfactorally at duty cycles of 30% or less. At duty cycles above this value, the circuit becomes unstable and does not operate as well. To provide a proper dwell time for the signal applied to ignition coil 11, without overheating the coil at low frequencies, the duty cycle of the signal should be approximately 40–75%. To achieve this, the signal at the collector of transistor Q10 is applied to the non-inverting inputs of respective operational amplifiers A3 and A4. The output of amplifier A3 is provided to the inverting input of amplifier A4 through a diode D15 and a resistor P39. A capacitor C11 is connected between the diode and resistor, and electrical ground. Capacitor C11 holds the peak level of the signal at the collector of transistor Q11. Further, a resistor R40 is connected between resistor R39 and the inverting input of amplifier A4, and electrical ground. Resistors R39 and R40 provide a discharge path for capacitor C11 and also form a voltage divider by which the peak level is supplied to the inverting input of amplifier A4 which functions as a comparator. Amplifiers A3 and A4 and their associated circuitry operate to increase the duty cycle of the signal to the 40–75% range.

As noted, the signal at the collector of transistor Q11 is provided to the base of transistor Q12. This transistor and its associated resistors R38 and R41 act to buffer the transistor Q11 output and invert the signal at the collector of this transistor. Also, the collector Q11 output is provided to the base of a transistor Q13 through a resistor R42. Transistor Q13 functions as a switch to control the output of amplifier A4.

Apparatus 1 next includes a coil driver means 50 responsive to the current signal to control current to ignition coil 11. Driver means 50 includes a power Darlington transistor Q14 having a high voltage zener diode D16. The output of amplifier A4 is provided to the base of a transistor Q15 through a resistor R43. Transistor Q15 acts as a predriven for Darlington Q14 and the transistor has an associated bias resistor R44 in its collector circuit. A high-frequency suppression capacitor C12 is shunted across the input and output of Darlington transistor Q14 and a base bias a resistor R45 connects between the input to the Darlington transistor and ground. A current sensing resistor R46 is connected between the emitter of the Darlington transistor and ground. A base bias resistor R47 connects between the base of transistor Q16 and the ungrounded side of resistor R46; while, a capacitor C13 connects between the base of this transistor and ground. Darlington transistor Q14 functions as is well known in the art to provide control of current to ignition coil 11. Transistor Q16 limits the input current applied to the Darlington transistor and capacitor C13 acts to prevent the circuit from oscillating.

Apparatus 1 also includes means for shutting-off driver means 50 when the engine is not running thereby to prevent application of current to the ignition coil 11 and reduce current drain. Apparatus 1 includes a stall time-out means 51 comprising a switching transistor Q17, and the signal at the collector of transistor Q12 is applied to the base of transistor Q17 through a diode D17. The signal at the collector of transistor Q12 is applied to summing point 43 (see FIG. 2A) via line 53. As noted previously, the frequency of the signal on this line is converted to a voltage at summing point 43 and this voltage together with the average voltage of the sensed vibration signal is applied to the inverting input of amplifier A2. A capacitor C14 is connected between the base of transistor Q17 and electrical ground, and a resistor R48, connected between bus line 33 and the base of transistor Q17, provides a charge path for capacitor C14. Lastly, the emitter of transistor Q17 is connected to the base of transistor Q13 through a resistor R49.

As previously noted, transistor Q13 controls the output of amplifier A4. When transistor Q13 is off, a signal from the amplifier is applied to Darlington transistor Q14 through transistor Q15. However, when transistor Q13 is on, the output of the amplifier is effectively grounded and no current is supplied to ignition coil 11. Transistor Q12 is a switching transistor whcih switches on and off while the engine is running but is normally off when the engine is not running. When transistor Q12 is off, capacitor C14 charges through resistor R48. Capacitor C14 charges to a level sufficient to turn transistor Q17 on. This, in turn, allows current to flow to the base of transistor Q13, turning on the transistor and grounding the output of amplifier A4. This shuts off driver means 50 and eliminates current drain while the engine is not running.

What has been described is apparatus for supplying current to an ignition coil from an ignition system while at the same time, modifying the ignition signal to retard the timing and thus reduce or eliminate engine knock. Further, the apparatus is effective to eliminate current drain when the engine is not running thus protecting the ignition coil from excessive heating which would shorten its life. The circuitry of the apparatus is also effective to operate stably at high engine speeds in order to effectively manipulate the current signal from the engine's ignition system and thereby produce the proper signal which would apply to the ignition coil eliminates knocking in the engine. Finally, the circuitry of the apparatus acts to rapidly retard the ignition signal once a knocking condition is sensed, but is slow to return the ignition signal to normal once the knocking condition has stopped.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. A spark control apparatus for an internal combustion engine using either a breaker point or solid state ignition system, the apparatus controlling current to an ignition coil and comprising:

means for converting the waveform of the current signal from the ignition system to a predetermined waveform;

means for sensing engine vibration and for generating an electrical signal representative thereof;

means for processing the electrical signal to determine engine knock by comparing the peak and average values of the electrical signal;

means for delaying termination of current to the ignition coil as a function of the comparison of the peak and average values of the electrical signal;

driver means responsive to the ignition signal for controlling current to the ignition coil; and, means for shutting off the driver means when the engine is not running thereby to prevent application of current to the ignition coil and reduce current drain, the shut-off means including first switching means which is normally off when the engine is not running, second switching means which turns off the driver means when on and control means controlling the second switch means to turn it on when the engine is not running, the shut-off means being responsive to changes in the operating state of the first switching means to switch the operating state of the second switching means, the first switching means including a solid-state device responsive to the predetermined current waveform to switch between on and off operating states when the engine is running and to remain in its off state when the engine is not running, the second switching means including a second solid-state device connected between the input to the driver means and electrical ground, the solid-state device, when on, electrically grounding the driver means input thereby shutting it off, and the controlling means including a capacitor having a discharge path in which the first said solid-state device is connected and a third solid-state device whose operating state is determined by the charge level of the capacitor, the third solid-state device being connected to the second solid-state device to control the operating state thereof, the first said solid-state device, when on, discharging the capacitor and maintaining the third solid-state device in its off operating state and the third solid-state device, in turn, keeping the second solid-state device off, and the first said solid-state device, when off, causing the capacitor to charge to a level at which the third solid-state device is turned on to, in turn, turn the second solid-state device on.

2. A spark control apparatus for an internal combustion engine using either a breaker point or solid-state ignition system, the apparatus controlling current to an ignition coil and comprising:
means for converting the waveform of the ignition signal from the ignition system to a predetermined waveform;
means for sensing engine vibration and for generating an electrical signal representative thereof;
means for processing the electrical signal to determine engine knock by comparing the peak and average values of the electrical signal;
means for delaying termination of the current to the ignition coil as a function of the comparison of the peak and average values of the electrical signal; and
driver means responsive to the ignition signal for controlling current to the ignition coil, the converted ignition signal having a variable delay and the delaying means including means for adjusting the maximum duty cycle of the ignition signal as a function of the number of engine cylinders, the delay in the termination of the ignition signal to the driver means being variable between a minimum and the adjusted maximum as a function of the comparison of the peak and average values of the electrical signal from the sensing means and the delaying means further including switch means insuring proper functioning of the delaying means at higher engine r.p.m.'s.

3. A spark control apparatus for an internal combustion engine using either a breaker point or solid-state ignition system, the apparatus controlling current to an ignition coil and comprising:
means for converting the waveform of an ignition signal from the ignition system to a predetermined waveform;
means for sensing engine vibration and for generating an electrical signal representative thereof;
means for processing the electrical signal to determine engine knock by comparing the peak and average values of the electrical signal;
means for delaying termination of the current to the ignition coil as a function of the comparison of the peak and average values of the electrical signal; and
driver means responsive to the ignition signal for controlling current to the ignition coil, the converted ignition signal having a variable delay and the delaying means including means for adjusting the maximum duty cycle of the ignition signal as a function of the number of engine cylinders.

4. The apparatus of claim 1 further including dwell means for adjusting the dwell portion of the predetermined current waveform which is applied to the driver means.

5. The apparatus of claim 1 wherein the converted ignition signal is variably delayable and the delaying means includes means for adjusting the maximum duty cycle of the ignition signal as a function of the number of engine cylinders.

6. The apparatus of claim 5 wherein the delaying means varies the delay in the application of the ignition signal to the driver means between a minimum and the adjusted maximum as a function of the comparison of the peak and average values of the electrical signal from the sensing means and the delaying means includes switch means insuring proper functioning of the delaying means at higher engine rpms.

7. The apparatus of claim 6 wherein the delaying means includes a first capacitor having a charging circuit and first and second discharging circuits, a first solid-state device responsive to the ignition signal for switching the first capacitor between charging and discharging, the adjusting means controlling the first discharging circuit, and a second solid-state device controlling the second discharging circuit.

8. The apparatus of claim 7 further including a second capacitor having a discharge path which is closed for variable periods determined by the comparison of the peak and average values of the electrical signal from the sensing means, the charged state of the second capacitor at any one time determining the operating state of the second solid-state device at that time and consequently the discharging current flowing through the second discharging circuit for the first capacitor at that time.

9. The apparatus of claim 8 wherein the switch means includes a third solid-state device controlling the second solid-state device, the third solid-state device, when in one operating condition, switching the second solid-state device to an inoperative condition blocking the second discharging circuit of the first capacitor, and when in its other operating condition permitting the operative condition of the second solid-state device to be controlled by the charged state of the second capacitor.

10. The apparatus of claim 6 wherein the delaying means includes a capacitor which is charged when the processing of the electrical signal from the sensor indicates no engine knock is occurring and discharged when the processing indicates engine knock is occurring, discharging of the capacitor causing retardation of the ignition signal, the capacitor having a charge circuit including a first resistor and a discharge circuit including a second resistor, the value of the first resistor being greater than the value of the second resistor for the discharge rate of the capacitor to be faster than its charge rate, whereby the ignition signal is rapidly retarded when an engine knock is sensed but slowly returned to its normal condition when the vibration has stopped.

11. The apparatus of claim 2 wherein the delaying means includes a first capacitor having a charging circuit and first and second discharging circuits, a first solid-state device responsive to the ignition signal for switching the first capacitor between charging and discharging, the adjusting means controlling the first discharging circuit, and a second solid-state device controlling the second discharging circuit.

12. The apparatus of claim 11 further including a second capacitor having a discharge path which is closed for variable periods determined by the comparison of the peak and average values of the electrical signal from the sensing means; the charged state of the second capacitor at any one time determining the operating state of the second solid-state device at that time and consequently the discharging current flowing through the second discharging circuit for the first capacitor at that time.

13. The apparatus of claim 12 wherein the switch means includes a third solid-state device controlling the second solid-state device, the third solid-state device, when in one operating condition, switching the second solid-state device to an inoperative condition blocking the second discharging circuit of the first capacitor, and when in its other operating condition permitting the operating condition of the second solid-state device to be controlled by the charged state of the second capacitor.

14. The apparatus of claim 2 wherein the delaying means includes a capacitor which is chared when the processing of the electrical signal from the sensor indicates no engine knock is occurring and discharged when the processing indicates engine knock is occurring, discharging of the capacitor causing retardation of the ignition signal, the capacitor having a charge circuit including a first resistor and a discharge circuit including a second resistor, the value of the first resistor being greater than the value of the second resistor for the discharge rate of the capacitor to be faster than its charge rate, whereby the ignition signal is rapidly retarded when an engine knock is sensed but slowly returned to its normal condition when the knock has stopped.

15. The apparatus of claim 2 further including means for shutting off the driver means when the engine is not running thereby to prevent application of current to the ignition coil and prevent current drain, the shut-off means including first switching means which is normally off when the engine is not running, second switching means which turns off the driver means when on and control means controlling the second switch means to turn it on when the engine is not running, the shut-off means being responsive to changes in the operating state of the first switching means to switch the operating state of the second switching means.

16. The apparatus of claim 3 wherein the delay in the termination of the ignition signal to the driver means is variable between a minimum and the adjusted maximum as a function of the comparison of the peak and average values of the electrical signal from the sensing means and the delaying means further includes switch means insuring proper functioning of the delaying means at higher engine r.p.m.'s.

17. The apparatus of claim 16 wherein the delaying means includes a first capacitor having a charging circuit and first and second discharging circuits, a first solid-state device responsive to the ignition signal for switching the first capacitor between charging and discharging, the adjusting means controlling the first discharging circuit, and a second solid-state device controlling the second discharging circuit.

18. The apparatus of claim 17 further including a second capacitor having a discharge path which is closed for variable periods determined by the comparison of the peak and average values of the electrical signal from the sensing means; the charged state of the second capacitor at any one time determining the operating state of the second solid-state device at that time and consequently the discharging current flowing through the second discharging circuit for the first capacitor at that time.

19. The apparatus of claim 18 wherein the switch means includes a third solid-state device controlling the second solid-state device, the third solid-state device, when in one operating condition, switching the second solid-state device to an inoperative condition blocking the second discharging circuit of the first capacitor, and when in its other operating condition permitting the operating condition of the second solid-state device to be controlled by the charged state of the second capacitor.

20. The apparatus of claim 3 wherein the delaying means includes a capacitor which is charged when the processing of the electrical signal from the sensor indicates no engine knock is occurring and discharged when the processing indicates engine knock is occurring, discharging of the capacitor causing retardation of the ignition signal, the capacitor having a charge circuit including a first resistor and a discharge circuit including a second resistor, the value of the first resistor being greater than the value of the second resistor for the discharge rate of the capacitor to be faster than its charge rate, whereby the ignition signal is rapidly retarded when an engine knock is sensed but slowly returned to its normal condition when the knock has stopped.

21. The apparatus of claim 3 further including means for shutting off the driver means when the engine is not running thereby to prevent application of current to the ignition coil and prevent current drain, the shut-off means including first switching means which is normally off when the engine is not running, second switching means which turns off the driver means when on and control means controlling the second switch means to turn it on when the engine is not running, the shut-off means being responsive to changes in the operating state of the first switching means to switch the operating state of the second switching means.

* * * * *